United States Patent [19]
Elligson

[11] Patent Number: 5,025,903
[45] Date of Patent: Jun. 25, 1991

[54] DUAL MODE ROTARY POWER TOOL WITH ADJUSTABLE OUTPUT TORQUE

[75] Inventor: Daniel M. Elligson, Millers, Md.

[73] Assignee: Black & Decker Inc., Newark, Del.

[21] Appl. No.: 462,369

[22] Filed: Jan. 9, 1990

[51] Int. Cl.[5] ..................... B23B 45/00; B25B 23/159; F16D 11/14

[52] U.S. Cl. ..................... 192/83; 192/34; 192/56 R; 192/93 A; 192/67 R; 173/13; 173/29; 81/475

[58] Field of Search ..................... 192/34, 56 R, 67 R, 192/93 A, 114 R, 110 R, 83; 173/12, 13, 29, 47; 81/473, 475

[56] References Cited

U.S. PATENT DOCUMENTS

| | | | |
|---|---|---|---|
| 1,699,870 | 1/1929 | Black et al. | 173/13 X |
| 2,857,997 | 10/1958 | Graybill | 192/34 |
| 2,884,103 | 4/1959 | Connell | 192/56 R |
| 2,950,626 | 8/1960 | Short | 192/34 X |
| 3,454,143 | 7/1969 | Beam et al. | 192/34 |
| 3,834,252 | 9/1974 | Abell et al. | 81/475 |
| 3,955,628 | 5/1976 | Grozinger et al. | 173/13 |
| 4,158,970 | 6/1979 | Laughon | 192/67 R X |
| 4,159,050 | 6/1979 | Hopkins, Sr. et al. | 192/34 |
| 4,161,242 | 7/1979 | Moores, Jr. et al. | 192/34 |
| 4,823,885 | 4/1989 | Okumura | 173/12 |

FOREIGN PATENT DOCUMENTS

| | | |
|---|---|---|
| 0132774 | 2/1985 | European Pat. Off. . |
| 0178252 | 4/1986 | European Pat. Off. . |
| 2325235 | 11/1974 | Fed. Rep. of Germany . |
| 3431630 | 3/1986 | Fed. Rep. of Germany . |
| 1414377 | 11/1975 | United Kingdom . |
| 2006656 | 5/1979 | United Kingdom . |
| 1601257 | 10/1981 | United Kingdom . |

OTHER PUBLICATIONS

Black and Decker Power Tools Catalog (1984), p. 7.

*Primary Examiner*—Richard Lorence
*Attorney, Agent, or Firm*—Dennis A. Dearing; John D. Del Ponti; Charles E. Yocum

[57] ABSTRACT

In an electrically powered combination screwdriver/-drill opposing halves of a ratchet type torque tranmsitting clutch are normally biased axially apart by a compression spring. The output half of the clutch is fixed on the output spindle of the tool which is free to move axially within limits. For screwdriving operation, operator bias of the tool against the workpiece overcomes the spring, retracting the output spindle and bringing the clutch halves into engagement. An adjustable stop in the nose of the tool limits axially rearward movement of the output spindle and hence depth of engagement of the clutch teeth, thus providing a variable limit on torque transmitted. For the drilling mode, the rearward half of the clutch is cammed forward so that the clutch is firmly engaged for continuous rotation of the output spindle without specific torque limitation. An operator may switch from drilling mode to screwdriving mode and back without disturbing the torque limit adjustment of the screwdriving mode.

27 Claims, 3 Drawing Sheets

DUAL MODE ROTARY POWER TOOL WITH ADJUSTABLE OUTPUT TORQUE

BACKGROUND OF THE INVENTION

The invention concerns power tools with a rotary output and particularly tools having more than one mode of operation and an adjustable means for limiting the output torque in at least one of the modes of operation.

Torque limitation or control is desirable or necessary in several modes of rotary power tool operation. For example, in a powered screwdriver used for setting screws or running nuts, torque control is necessary for achieving the performance specifications of the fastener, or at least avoiding the stripping of threads. In a hammer drill, constant slipping of a ratcheting clutch at a predetermined substantially constant torque may produce the vibration which gives the tool its hammering effect. Typically, clutches used in rotary power tools depend for torque transmission on the biasing together of opposing toothed clutch faces with some axial engagement or overlap of the teeth, although plain friction discs are used in some applications.

In a common form of powered screwdriver, providing only the screwdriver mode of operation, final torque transmission into the output spindle depends upon engagement of a positive drive clutch responsive to partial axial retraction of the output spindle when pressure is applied to the workpiece. Torque limitation is provided by a second clutch in which opposing clutch halves are biased together by a compression spring. Disadvantages of this arrangement are the relative bulk and weight of the torque limiting clutch and inconvenience in adjusting the spring pressure. See, for example, West German Patent DE 2,325,235 Pfab and European Patent EP 0,178,252 Duerr.

An improved screwdriver arrangement (in a single purpose tool) is disclosed in U.S. Pat. No. 3,834,252, Abell, also assigned to the assignee of the present invention. Here, driving engagement of the output spindle again depends on axial displacement of the spindle responsive to work piece pressure, but a single clutch is used for both drive engagement and torque limitation. Adjustably precise control of axial depth of tooth engagement in mating clutch halves, combined with a clutch tooth profile of varying pressure angle provides, selectively, a wide range of torque limitation. Advantages of the design are its compactness and relatively lower cost and lighter weight and particularly the convenience and repeatable control of the torque limitation adjustment.

In combination tools, having two modes of operation (output modes), such as screwdriver/drills or hammer/-drills, the tool transmission must be readily convertible from a condition providing a first output mode such as drilling (continuous rotation, usually without specific task torque limitation) to a second condition in which output torque is limited to suit the task in hand. Typically the same torque transmitting clutch is used for both modes. The clutch is mechanically maintained in firm engagement for the "live spindle" sustained rotation as in drilling. For a screwdriving or hammering mode the clutch is selectively engaged and torque limitation while in engagement may depend on operator provided bias of the tool against the workpiece. See for example British Patent 1,601,257 also assigned to the assignee of the present invention. With this arrangement, insofar as variable output torque limitation is available in a single tool, torque level and repeatability depends largely on operator skill in controlling his pressure of the tool against the workpiece.

In another form of combination screwdriver/drill, disclosed in U.S. Pat. No. 4,823,885, Okumura, a single spring loaded axial engagement type clutch is in constant engagement in both modes of operation, except when slipping at a predetermined torque in the screwdriver mode. A relatively convenient single adjustment arrangement permits an operator both to adjust clutch spring compression to provide torque limitation at a selected level for the screwdriver mode and to compress the spring fully for firm, non-slipping engagement of the clutch for the drill mode. An indicator in the adjustment system allows the operator to return at will to a previously used torque setting but, even so, it is inconvenient to be required to "lose" the torque limit setting each time the tool is shifted from one mode of operation to the other.

Clearly it would be desirable when using a combination tool for repetitive work that the torque limitation setting of one mode of operation remain undisturbed when the tool is shifted to a second mode of operation and again returned to the first. Obviously, in a simple transmission, the clutch used for a variable torque limitation mode must also be convertible to the "live spindle" (or no specific torque limitation) mode. Shifting from one operating mode to the other becomes essentially a matter of clutch differentiation or clutch control. Although desirable, there is an inherent conflict or difficulty in arranging for a single adjustable torque transmitting clutch, operable selectively in either one of two conditions, to be convertible to the second condition without disturbing the adjustment setting of the first condition. No such desirable arrangement is known.

SUMMARY OF THE INVENTION

Accordingly, it is an object of the invention to provide in a combination rotary tool having at least two output modes and in which, in at least one output mode, an output parameter is adjustable, means for shifting from a first output mode to a second output mode without disturbing the level of adjustment of the output parameter.

It is a further object to provide in a combination rotary tool having first and second output modes, simple and convenient means for adjusting an output parameter of the first mode to a selected level which is reliably regained after shifting to the second mode and back into the first mode.

These objects may be realized in a tool such as a combination screwdriver/drill having a torque transmitting clutch of the type which depends on overlapping axial engagement of axially opposed clutch halves, including a rear clutch half driven by the power source of the tool and a forward clutch half for driving an output member of the tool, by providing means for selective control of axial disposition of the rear half of the clutch. Preferably the axial disposition of the forward half of the clutch is also controllable and also optionally adjustable for setting a predetermined limitation on torque available at the output member.

According to the invention selective independent movement of each half of the clutch may establish one each of two modes of operation.

In a preferred embodiment, control of the rear or input half of the clutch establishes a drill mode in a screwdriver/drill combination. And, preferably, in a second or screwdriver output mode, the forward or output clutch half remains intermittently engageable responsive to operator pressure of the tool against a workpiece.

In the preferred embodiment, adjustability of output torque limitation depends upon adjustable stop means for controlling the depth of engagement of the clutch teeth.

Thus in a combination tool according to the invention a simple transmission configuration, with potentially low cost control components, provides for shifting between a first and a second mode of operation without disturbing an adjustment setting which may have been established in one of the modes of operation. In production operations, alternating between modes, operator time is not wasted in constantly resetting, possibly inaccurately, an adjustable output torque limitation and productivity is potentially increased. Quality of work is less dependent on operator skill and operator fatigue is reduced.

DESCRIPTION OF THE PREFERRED EMBODIMENT

Figure 1:
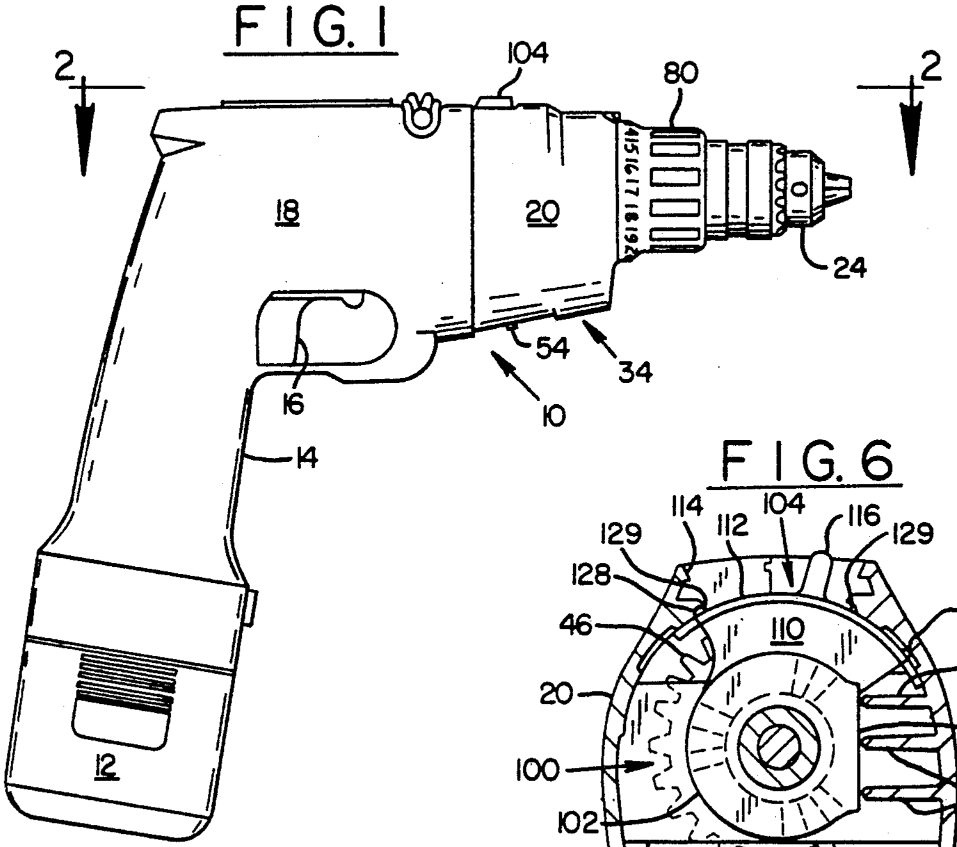
FIG. 1 is a side view of a combination screwdriver/-drill embodying the invention. This power tool has a rotary output usable selectively in drilling and screwdriving modes.
Figure 2:
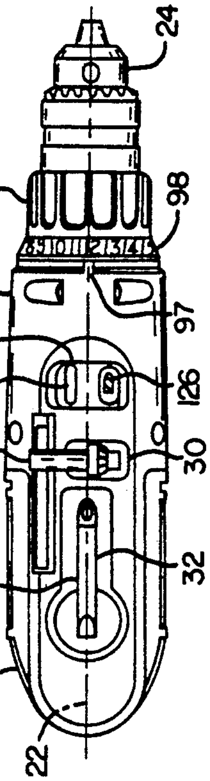
FIG. 2 is a partial top view of the main body portion of the tool, approximately on line 2—2 of FIG. 1.

The invention is embodied in the combination screwdriver/drill 10, the general arrangement of which is shown in FIGS. 1 and 2. This embodiment is exemplary only and the invention is applicable to any power tool having two or more output modes, each mode being established by control of a torque transmitting clutch, and including means for adjustably limiting torque transmitted in at least one of the output modes. In the present embodiment the tool is "cordless" (electrically powered by a battery pack 12), but other power sources may be used.

The screwdriver/drill 10 is of generally conventional overall configuration and includes a pistol grip handle 14 with a trigger control switch (only the trigger 16 of the switch is shown). Main and transmission housing portions 18 and 20 are conventionally split on a central plane 22 of the tool and substantially enclose principal components of the tool. In this embodiment the final rotary output member is a conventional chuck 24 for gripping any one of a variety of workpiece engaging tools, such as drill or screwdriver bits. As indicated in FIG. 2, a chuck key 26 and at least one screwdriver bit 28 may be stored in receptacles 30, 32 on top of the tool.

Power input to the tool transmission 34 is by motor pinion 36 carried by output shaft 38 of electric motor 40. The pinion 36 drives an input gear 42 carried on an intermediate transmission shaft 44. From this shaft power is transmitted selectively to high speed gear 46 or low speed gear 48 of an output gear assembly 50, by means of a slidable gear shift assembly 52 coaxial with the intermediate shaft 44 and controlled manually by the gear selector handle 54 which emerges from the bottom of the transmission housing 20. Output gear subassembly 50 is a rigid unit, free to rotate on output spindle 56.

Torque is transmitted to the output spindle 56 by clutch 58. The clutch is of the type which depends on axially overlapping engagement of axially extending teeth on a clutch face and, preferably, is of the type in which torque transmitted may be limited by control of the axial force biasing the clutch halves together and/or control of the depth of engagement of the clutch teeth. A clutch of this general type is described in detail in U.S. Pat. No. 3,834,252, Abell sharing a common assignee with the present invention and hereby incorporated by reference. In the present embodiment clutch 58 consists of axially opposed clutch halves 60, 62 forming, respectively, part of the faces of the low speed output gear 48 and a spindle drive collar 64 fixed on the output spindle 56. The spindle 56 is journaled in front and rear bearings 66, 68 respectively and is free to move axially in these bearings, at least within limits which will be defined in the following description. Compression spring 70 normally biases the clutch faces 60, 62 apart, the condition shown in FIGS. 3 and 7.

Figure 7:
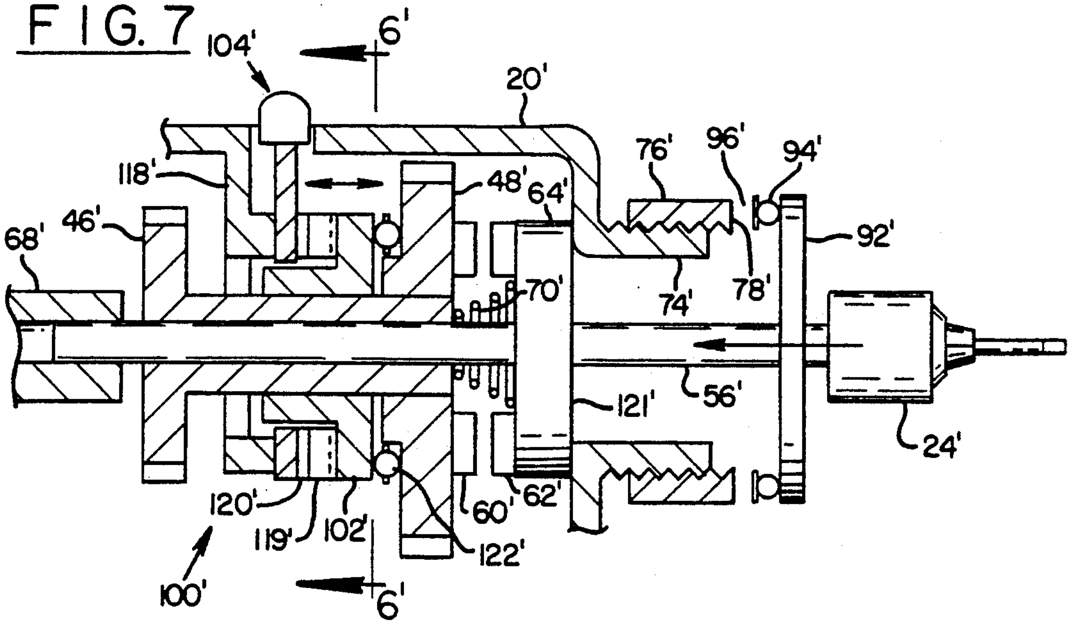
FIG. 7 is a semi-schematic partial view showing the output drive elements in the same condition as FIG. 3 (prepared for screwdriving operation) and including elements of the torque transmitting clutch of the tool and related control members.
Figure 3:
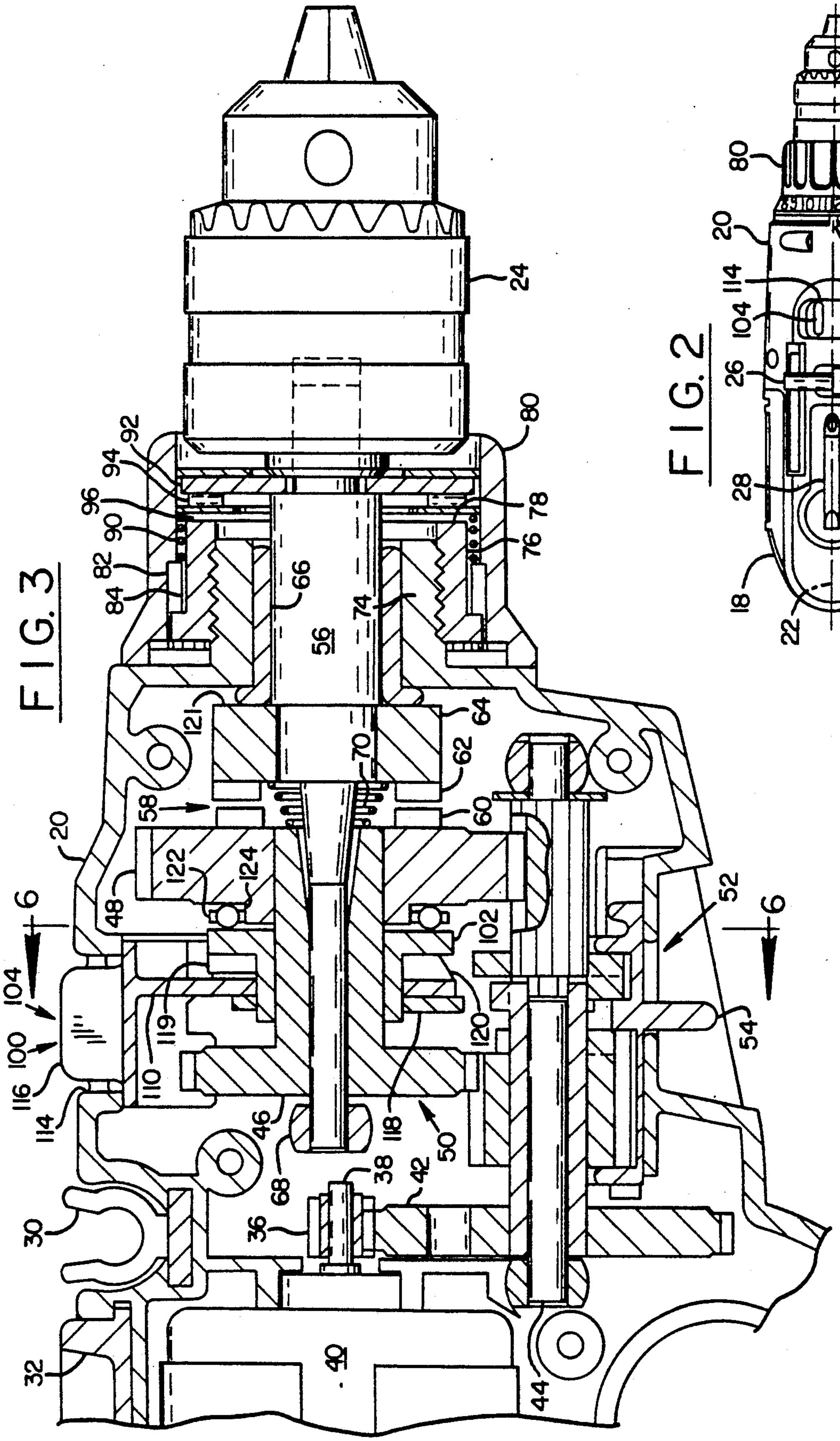
FIG. 3 is a much enlarged, partial center line cross sectional view, viewed in the same direction as FIG. 1 and showing the transmission and output portions of the tool prepared for use in the screwdriving mode but not engaged with a workpiece.

Turning now to control arrangements for the clutch 58 and looking first at the screwdriving mode—a threaded nose portion 74 of the transmission housing 20 carries an adjusting nut 76 which is rotatably adjustable, effectively varying the length of the housing and providing an axially adjustable stop face 78. An adjusting collar 80 surrounding the adjusting nut 76 has internal splines 82 engaging external splines 84 on the adjusting nut 76. The adjusting collar 80 is normally biased rearwardly by a compression spring 90, into a rotationally locked position engaging a detent arrangement (not shown). Immediately ahead of the adjusting stop face 78, the spindle 56 carries a fixed stop washer 92 and, between the washer and the stop face, a thrust bearing 94. When ready for screw-driving operation, as shown in FIGS. 3 and 7, the compression spring 70 maintains the output spindle 56 in a forward position so that there is a gap 96 between the adjustable stop face 78 and the thrust bearing 94. In screwdriving operation the tool is applied to a workpiece with sufficient thrust to overcome the spring 70 so that the spindle is retracted, closing the gap 96, until the thrust bearing 94 engages the stop face 78, and the clutch faces 60, 62 are axially engaged to a depth related to the size of the gap 96. Depth of tooth engagement may thus be adjusted by pulling the adjusting collar 80 forward to release it for rotation and rotationally adjusting it and hence the adjusting nut 76, as desired. An index tab 97 and the associated numerical scale 98 provided on the collar 80 allow an operator to accurately and repeatably set the clutch for a desired torque limitation in the screw-driving mode. The teeth of the clutch faces 60, 62 may be of the type having varying pressure angle so that transmittal torque limitation depends largely on the depth of tooth engagement and to a lesser degree on the bias of the tool against the workpiece by the operator. The construction and operation of a clutch with teeth of this type is described in detail in the patent to Abell referred to above.

Figure 6:
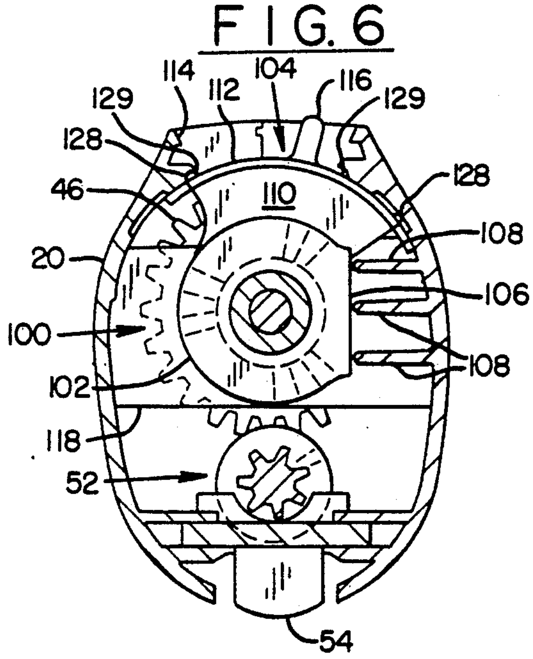
FIG. 6 is a cross sectional view taken approximately on line 6—6 of FIG. 3, showing aspects of the cam arrangement for placing the torque transmitting clutch of the tool in the drilling mode. This view also corresponds to one taken approximately on line 6′—6′ in the semi-schematic of FIG. 7 but not shown.
Figure 4:
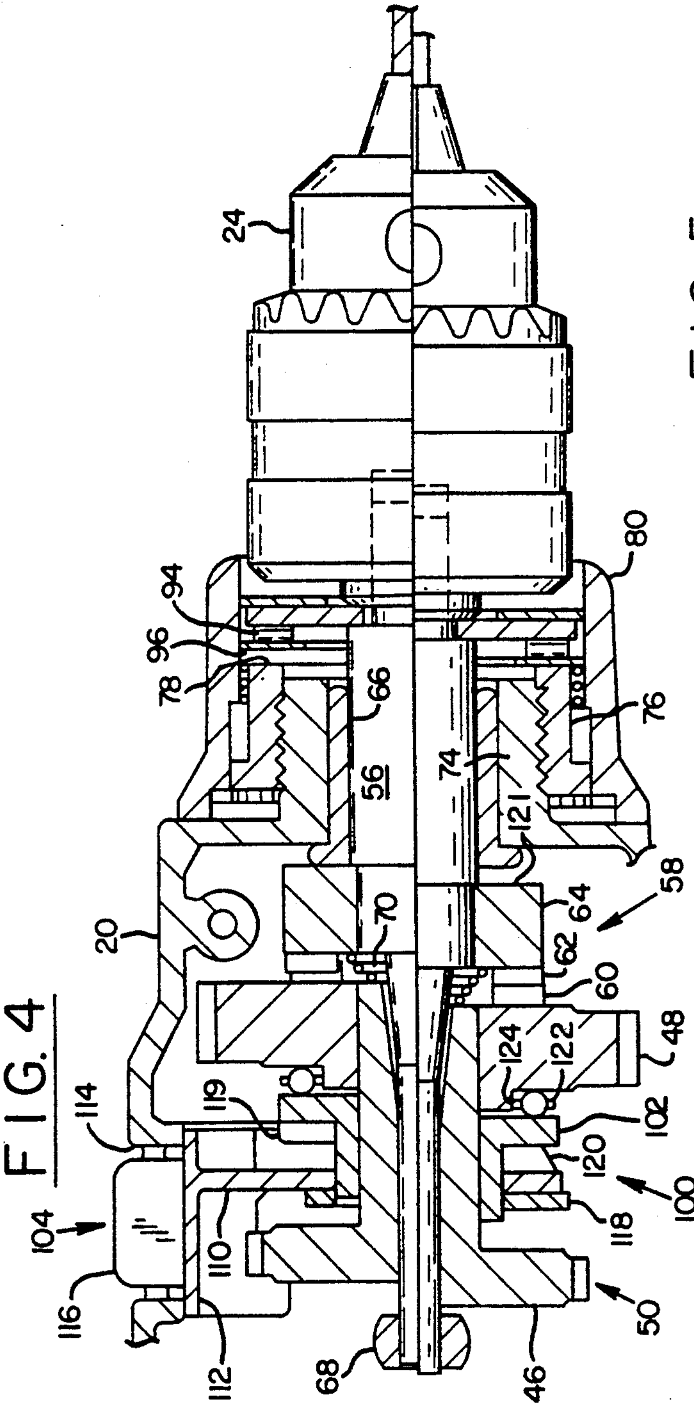
FIG. 4 is a composite partial view of the structure shown in FIG. 3 but showing the tool in two different additional conditions—in the lower half of the figure in screwdriving operation and in the upper half of the figure, prepared for the drilling mode (and also as in drilling operation).
Figure 5:
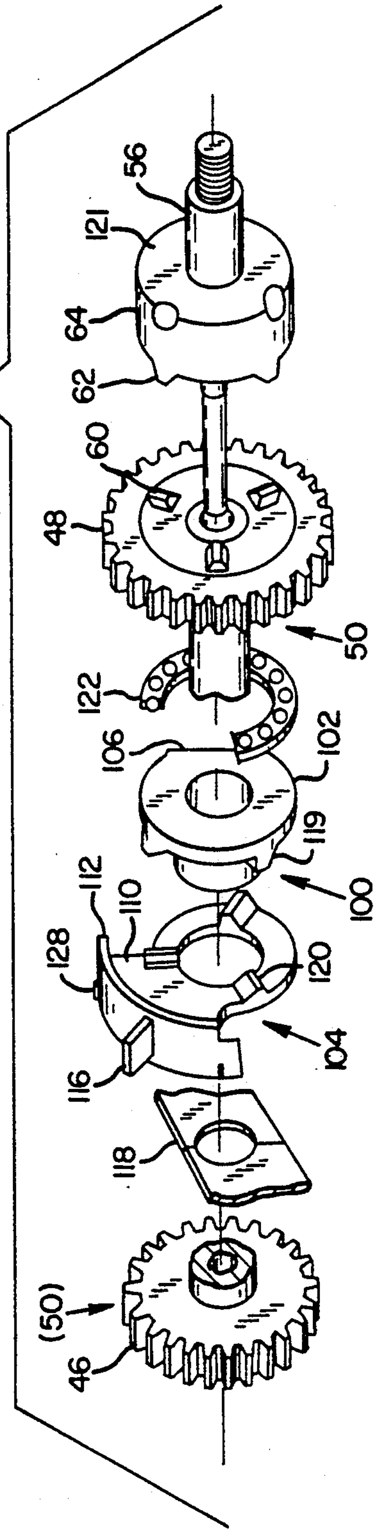
FIG. 5 is an axially exploded view of the principal components of the torque transmitting clutch of the tool, and related clutch control components, but omitting components for adjusting the clutch in the screwdriving mode.

To establish the drilling mode the clutch input member, low speed output gear 48, is cammed forward by a cam arrangement 100 into full and firm engagement with clutch output member, collar 64, as shown in the upper half of FIG. 4. The cam arrangement includes a collar-like cam 102 and a cam shifter 104, both captive on but rotatable relative to the output gear assembly 50. As seen in FIG. 6, the cam 102 is prevented from rotating relative to the housing 20 by the engagement of a peripheral flat surface 106 of the cam with axially extending ribs 108 formed on the wall of the housing 20 and defining a planar surface with which, in assembly, the cam flat 106 is brought into register. The cam shifter 104 includes an upwardly extending web portion 110, capped by an arcuate shroud 112 which underlays an opening 114 in the wall of the housing 20 and generally conforms to the contour of the adjacent housing. A finger tab 116 for manual manipulation of the cam shifter extends through the opening 114. The cam shifter 104 bears against a fixed bulkhead 118 extending from a wall of the transmission housing 20, preventing it from moving axially rearward. Opposing faces of the cam 102 and cam shifter 104 carry cooperating cam lobes 119, 120 respectively, so that when the cam shifter 104 is rotatably adjusted relative to the housing 20, the cam 102, prevented from rotation by its engagement with the housing (flat 106 with ribs 108) is biased axially forward moving, the output gear subassembly 50 with it and bringing the clutch 58 into full and firm engagement for the drilling mode. In this condition, shown in the upper portion of FIG. 4, the tool output spindle 56 is held in an essentially fixed axial position by the containment of the tool spindle collar 64, through its firm engagement with the clutch face 60 of the output gear 48 and by the bearing of its front face 121 against the bearing 66. Axially rearward loading on the output spindle 56 in operation is absorbed by thrust bearing 122 carried on a shoulder 124 of the output gear 48, and backed up by the cam arrangement 100, bearing against the bulkhead 118.

The cam arrangement 100, operated by the cam shifter 104 and controlling the position of the clutch input member, output gear 48, is intended to be used to position the input clutch member in only either one of two "extreme" positions fully forward for full and firm engagement of the clutch for the drilling mode (top of FIG. 4) or fully axially retracted for the screw-driving mode (FIGS. 3 and 7 and the lower half of FIG. 4). Graphic symbols on the cam shifter shroud 112 indicate the condition selected. Only one of these symbols is shown in the drawings - symbol 126 for the drilling mode shown in FIG. 2. Ribs 128 on the cam shifter shroud 112 engage detent like recesses 129 in the wall of the housing 20 to retain the cam shifter 104 in its selected position.

The tool described exemplifies a tool having a rotary output with two operating modes, differentiation between the modes depending on the controlled axial disposition of axially opposing clutch members. The clutch members are biased apart so that the normal condition of the clutch is disengaged Essentially, one clutch member is controlled for a first mode and the other clutch member for a second mode. In the present embodiment, axial movement of the output clutch member, collar 64, is controlled for the screwdriving mode. Axial movement of the input clutch member, output gear 48, is controlled for the drilling mode. Separation of the control functions in this way makes it possible to provide for adjustment of one of the output parameters of one of the respective modes in such a way that shifting the tool back and forth between the respective operating modes may be done without disturbing the adjusted setting of the adjustable output parameter. The potential benefit of such an arrangement is that not only may time be saved in avoiding the necessity for repeatedly resetting the adjustment level but also that the desired adjustment level is accurately maintained in repetitive operations. And quality of work is less dependent on operator skill and operator fatigue is reduced.

I claim:

1. A portable powered operated tool operable selectively in first and second operating modes and having a torque limit in one of the modes, comprising:

a housing;

a motor within the housing;

a rotary output member in the housing;

a torque transmitting clutch within the housing including a first clutch member drivably connected to the motor and a second clutch member drivably connected to the output member, the first and second clutch members engageable for transmission of rotational torque from the motor to the output member;

means for shifting the first and second clutch members between a first engaged position and a second disengaged position corresponding to the first and second operating modes, respectively;

bias means normally urging the first and second clutch members to the second disengaged position; and said shifting means for moving the first clutch member axially into the first engaged position with the second clutch member.

2. The power operated tool of claim 1 wherein, in the first operating mode, the clutch members are maintained in firm engagement.

3. The power operated tool of claim 1 wherein the second clutch member is axially movable in the second node of operation.

4. The power operated tool of claim 1 wherein the first operating mode is a drilling mode in which rotation of the output member is sustained without specific torque limitation, and the second operating mode is a screwdriving mode in which the driven rotation of the output member is torque limited.

5. The power operated tool of claim 4 further comprising adjusting means for the maximum torque transmittable by the said setting of the adjusting means is independent of movement of the first clutch member so that the first operating mode may be selected without affecting the setting of the adjusting means for the second operating mode.

6. The power operated tool of claim 1 further comprising means for limiting the maximum torque transmittable by the clutch, said means being effective only when the tool is in the second operating mode.

7. A power operated tool said tool comprising:
- a housing;
- a motor within the housing;
- a rotary output member;
- a clutch having normally spaced apart input and output halves, the input half drivably connected to the motor and the output half being drivably connected to the rotary output member, the clutch halves axially engageable for transmitting torque from the motor to the rotary output member; and
- means mounting (1) the input clutch half for selective axial movement relative to the output clutch half to engage the output clutch half and (2) the output clutch half for selective axial movement relative to the input clutch half to engage the input clutch half.

8. The power operates tool of claim 7 further comprising cam means effective between the housing and the clutch input half for moving the clutch input half axially into engagement with the clutch output half.

9. The power operated tool of claim 7 wherein the clutch output half is responsive to axial movement of the rotary output member for axially moving the clutch output half into engagement with the clutch input half.

10. The power operated tool of claim 7 wherein, the tool has first and second operating modes and in the second mode of operation, the torque transmittable by the clutch depends, at least in part, upon the extend of axial engagement of the clutch halves and including adjustment means for controlling said engagement.

11. The power operated tool of claim 7 wherein the tool has first and second operating modes and the first mode of operation is a drilling mode in which driven rotation of the rotary output member is maintained without specific torque limitation, and wherein the second mode of operation is a screw driving mode in which driving of the rotary output member is adjustably torque limited.

12. A power tool selectively operable in first and second operating modes and having a motor, a rotary output shaft, and a clutch for drivably connecting and transferring torque between the output shaft and the motor, the clutch having axially separable input and output halves, characterized in that:
- the first mode of operation has no torque limit and is established by axially displacing the clutch input half to engage the clutch; and
- the second mode of operation has a torque limit and is established by axially displacing the clutch output half to engage the clutch.

13. The power tool of claim 12 wherein the first mode of operation is a drilling mode in which output shaft is drivable without specific torque limitation.

14. The power tool of claim 12 wherein the second mode of operation is a screw driving mode in which the driving of the output shaft is adjustably torque limited.

15. The power tool of claim 12 characterized by means for axially biasing the clutch halves apart.

16. The power tool of claim 15 wherein the clutch halves are engageable by axially displacing the output shaft towards the clutch and overcoming the biasing means.

17. The power tool of claim 12 wherein, in operation, for torque transmittal between the motor and the output shaft, there is a selectively predetermined axially overlapping engagement between the clutch halves.

18. The power tool of claim 17 wherein, in the first mode of operation, the clutch halves are fully axially engaged.

19. The power tool of claim 17 characterized by adjustment means effective in the second operation mode for limiting the extent of axial engagement of the clutch halves.

20. The power tool of claim 12 characterized by adjustment means for setting a torque limit effective in at least one of the operating modes and wherein the respective clutch halves are independently controllable for selecting mode of operation and the setting of the adjustment means in the at least one operating mode is not affected by selection of the other mode.

21. In a portable power tool having a first operating mode without a torque limit, a second operating mode with an adjustable torque limit, a housing and a motor within the housing and a forward output member rotatably drivable about a longitudinal axis and a normally disengaged clutch for drivably connecting the motor to the output member, the clutch having axially opposing respective clutch rear input and forward output halves of the type which depend on axially overlapping mutual engagement for torque transmission, a control arrangement for the clutch comprising:
- resilient means for biasing the clutch halves apart;
- means for mounting the clutch input half for axial movement;
- a rearward stop disposed in a fixed relationship with the housing for limiting rearward axial movement of the clutch output half;
- means for mounting the clutch output half for axial movement to engage the clutch input half for a second operating mode by applying sufficient rearward axially force to the output member to overcome the bias of the resilient means;
- a forward stop disposed in a fixed relationship with the housing for limiting the forward axial movement of the clutch output half; and
- means for camming the clutch input half forward to engage the clutch output half for a first operating mode.

22. The control arrangement of claim 21 wherein the camming means is interposed between the rearward stop and the clutch input half.

23. The control arrangement of claim 21 wherein, in the first operating mode, the clutch halves are firmly engaged and the output member is drivable without specific torque transmission limitation.

24. The controlled arrangement of claim 21 further comprising adjusting means for controlling the axial engagement of the clutch halves to establish a selected maximum torque for driving the output member.

25. The control arrangement of claim 24 wherein said adjusting means includes a forwardly extending adjustable element associated with the housing and engageable by the output member for adjustably limiting the axially rearward movement of the output member and thus limiting the extent of axially overlapping engagement of the clutch halves to establish a predetermined limitation of transmittable torque.

26. The control arrangement of claim 21 wherein the first mode of operation is a drilling mode in which the output member is rotatably drivable without specific torque limitation and the second operating mode is a screw driving mode in which the maximum torque transmitted to the output member is selectively adjustably limited.

27. The control arrangement of claim 21 wherein the clutch halves and the means for camming are contained axially substantially between the forward and the rearward stops.

* * * * *